(12) United States Patent
Taylor

(10) Patent No.: US 8,867,793 B2
(45) Date of Patent: Oct. 21, 2014

(54) SCENE ANALYSIS USING IMAGE AND RANGE DATA

(75) Inventor: Camillo Jose Taylor, Philadelphia, PA (US)

(73) Assignee: The Trustees Of The University Of Pennsylvania, Philadelphia, PA (US)

( * ) Notice: Subject to any disclaimer, the term of this patent is extended or adjusted under 35 U.S.C. 154(b) by 0 days.

(21) Appl. No.: 13/309,558

(22) Filed: Dec. 1, 2011

(65) Prior Publication Data

US 2012/0250978 A1 Oct. 4, 2012

Related U.S. Application Data

(60) Provisional application No. 61/418,805, filed on Dec. 1, 2010, provisional application No. 61/418,789, filed on Dec. 1, 2010, provisional application No. 61/418,799, filed on Dec. 1, 2010.

(51) Int. Cl.

| | | |
|---|---|---|
| *G06T 17/00* | (2006.01) | |
| *G06T 7/20* | (2006.01) | |
| *G06T 7/00* | (2006.01) | |
| *G06K 9/00* | (2006.01) | |
| *H04N 7/18* | (2006.01) | |

(52) U.S. Cl.
CPC .......... *G06K 9/00771* (2013.01); *G06T 7/2093* (2013.01); *H04N 7/181* (2013.01); *G06T 7/0081* (2013.01); *G06T 2207/30241* (2013.01)
USPC .......................................... 382/106; 382/154

(58) Field of Classification Search
None
See application file for complete search history.

(56) References Cited

U.S. PATENT DOCUMENTS

| | | | |
|---|---|---|---|
| 7,421,113 B2 | 9/2008 | Taylor | |
| 7,522,765 B2 | 4/2009 | Taylor | |
| 2002/0196976 A1 | 12/2002 | Mihcak et al. | |
| 2004/0109585 A1* | 6/2004 | Tao et al. | 382/106 |
| 2010/0020074 A1* | 1/2010 | Taborowski et al. | 345/420 |
| 2011/0235908 A1 | 9/2011 | Ke et al. | |
| 2012/0249802 A1 | 10/2012 | Taylor | |
| 2012/0250984 A1 | 10/2012 | Taylor | |

OTHER PUBLICATIONS

Chhay Sok et al, "Visually Aided Feature Extraction from 3D Range Data", 2010 IEEE International Conference on Robotics and Automation, May 2010, pp. 2273-2279.*

Camillo, "Fast Segmentation via Randomized Hashing", Proceedings of the British Machine Conference, BMVA Press, Sep. 2009, 60.1-60.11.

Quinn et al, "VISNET: A Distributed Vision Testbed" in ACM/IEEE International Conference on Distributed Smart Cameras, Sep. 2008, 364-371.

(Continued)

*Primary Examiner* — Brian P Werner
(74) *Attorney, Agent, or Firm* — Baker & Hostetler LLP

(57) ABSTRACT

Image and range data associated with an image can be processed to estimate planes within the 3D environment in the image. By utilizing image segmentation techniques, image data can identify regions of visible pixels having common features. These regions can be used to candidate regions for fitting planes to the range data based on a RANSAC technique.

15 Claims, 23 Drawing Sheets
(22 of 23 Drawing Sheet(s) Filed in Color)

(56) References Cited

OTHER PUBLICATIONS

Kayumbi, "Global Trajectory Reconstruction From Distributed Visual Sensors" in International conference on distributed Smart Cameras, 2008, 1-8.

Medeiros et al, "Distributed Object Tracking Using a Cluster-Based Kalman Filter in Wireless Camera Networks", IEEE Journal of Selected Topics in Signal Processing, 2(4), 448-463.

Klausner et al, "Distributed Multilevel Data Fusion for Networked Embedded Systems", in Selected Topics in Signal Processing, IEEE Journal of Publication Date: Aug. 2008.

Focken, D., and Stiefelhagen, R., "Towards Vision-Based 3-d People Tracking ina Smart Room" in Proceedings of the Fourth IEEE International Conference on Multimodal Interfaces (ICMI 02), 2002, 400-405.

* cited by examiner

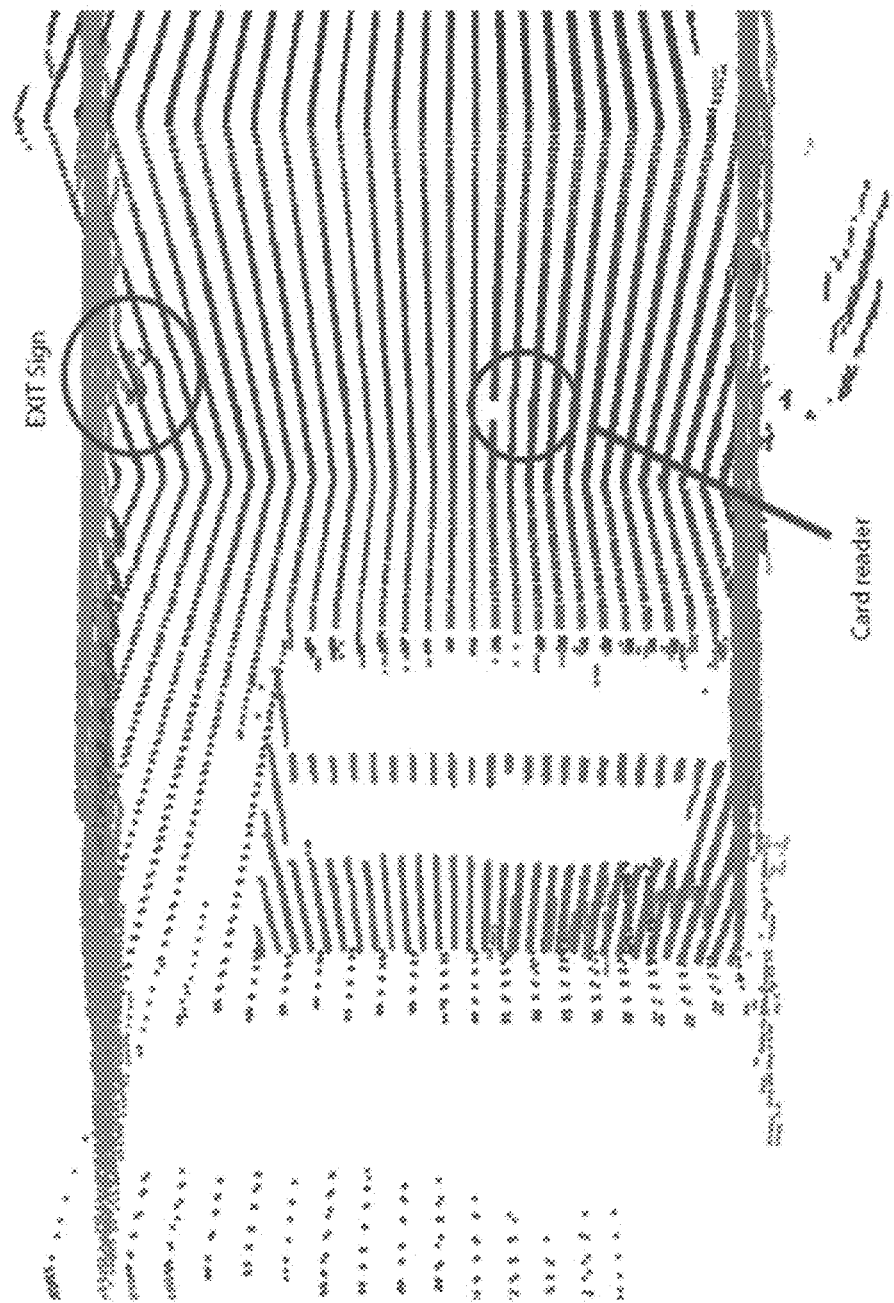

US 8,867,793 B2

SCENE ANALYSIS USING IMAGE AND RANGE DATA

CROSS REFERENCE TO RELATED APPLICATIONS

The present application claims priority to provisional patent applications 61/418,789, 61/418,805, and 61/418,799 which are incorporated by reference in their entirety.

The present application relates to provision patent applications entitled "Distributed Target Tracking Using Self Localizing Smart Camera Networks", patent application Ser. No. 61/418,799 and "Image Segmentation for Distributed Target Tracking and Scene Analysis", patent application Ser. No. 61/418,789 both of which are incorporated by reference in their entirety and filed on the same day as the present application entitled "Scene Analysis Using Image and Rage Data."

TECHNOLOGY FIELD

The present invention relates generally to machine vision systems and methods and specifically to scene analysis using image and depth data.

BACKGROUND

Over the past decade the advent of smaller, cheaper range sensors has made it more attractive to field robots that can acquire 3D range maps of their environment. Early systems made use of single scan range finders such as the SICK or Hokuyo sensors which were mounted on moving platforms or pan-tilt heads and scanned across the scene to produce a 3D point cloud. More recently, range sensors such at the SR 4000 'Swiss Ranger' from Mesa Imaging and the Velodyne scanning range sensor have been used to produce two dimensional range images at high frame rates.

The recently announced 2D range camera systems from Canesta and Primesense promise to further accelerate this trend by providing real time range imagery at a very compelling price point. The Primesense sensor, which will be employed in the Xbox Kinect system, is a particularly interesting example since it acquires a color video stream along with the range imagery which makes it easier to deploy schemes that exploit both sources of information simultaneously.

It is desirable to endow robots with the ability to extract relevant high level percepts from the stream of sensor data. For instance, in an indoor environment it would be useful for the robot to be able to quickly detect relevant objects such as walls, doors, windows, tables and chairs.

One issue with prior art segmentation methods is that they require a considerable amount of computational effort and, as such, they are not ideally suited to a robotic context where we are typically interested in processing large volumes of data quickly. It is desirable to produce competitive segmentation results in real time with modest computational effort.

SUMMARY OF THE INVENTION

Embodiments of the present invention address and overcome one or more of the above shortcomings and drawbacks, by providing devices, systems, and methods for determining features in a 3-D environment. This technology is particularly well-suited for, but by no means limited to, a imaging systems utilizing imaging fields of view.

Embodiments of the present invention are directed to a method for identifying features in an image, including receiving an image having color image data and depth information. A first set of segments, including a first segment, is identified in the image using an image segmenting technique. A first set of 3D points associated with the first segment in the depth information is identified. The method then estimates a plane that describes the 3D points associated with the first segment.

According to one embodiment of the invention, the step of estimating a plane comprises using a RANdom SAmple Consensus to estimate a best fitting plane. According to one aspect of the invention, the steps of identifying a set of 3D point and estimating a plane are repeated for each segment in the first set of segments. According to one embodiment of the invention, the method includes a step of determining a first subset of the first set of segments based on the size of each segment, wherein the steps of identifying a first set of 3D points and estimating a plane that describes the 3D points are repeated for each segment in the first subset of segments.

Additional features and advantages of the invention will be made apparent from the following detailed description of illustrative embodiments that proceeds with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 10 shows a closeup output view of a scene interpretation process for a scenario as analyzed by certain embodiments.

DETAILED DESCRIPTION OF ILLUSTRATIVE EMBODIMENTS

The present application presents a scheme which takes as input a 3D point cloud and an associated color image and parses the scene into a collection of salient planar surfaces. The scheme makes use of a fast color segmentation scheme to divide the color image into coherent regions and the groupings suggested by this procedure are used to inform and accelerate a RANSAC based interpretation process. RANSAC is an abbreviation for "RANdom SAmple Consensus." It is an iterative method to estimate parameters of a mathematical model from a set of observed data which contains outliers. The present application can utilize relatively inexpensive sensors that can be used to acquire range imagery at video rates. These range video cameras can be paired with standard image sensors to provide rich descriptions of the scene in front of the robot. The methods for using this system could be used to parse these kinds of data streams in an online manner to provide the robot with a higher level understanding about its environment.

The proposed scheme leverages a real-time segmentation scheme based on randomized hashing which is used to group the 3D points in the point cloud into subsets which are likely to lie on the same surface in the scene. These 3D points may include a range image of the scene. This grouping is used to inform a RANSAC based interpretation scheme which uses this grouping as a priority to bias its sampling procedure.

Fusing the image and range data in this manner allows for identifying salient surfaces in scenes with relatively little random exploration. Hence, the scheme can be run relatively quickly on realistic data sets. Furthermore, using the image segmentation data as a prior helps the system to identify small, but salient surfaces that would be difficult to detect through purely random sampling. The results indicate that even a fairly rough segmentation of the image can provide very useful information since no particular effort was made to tune the segmentation procedure to produce an optimal decomposition and one can easily notice several artifacts in the segmentation image caused by under or over segmentation. This is not terribly problematic since the segments are being used as advice rather than as 'ground truth' and in that role the segmentation is correct much more often than not.

The ancillary cues provided by the segmentation procedure can also be used to focus the interpretation process. As an example the size and position of the image segments in the frame can provide useful cues about the extent or importance of the associated regions. One may want to focus ones attention on large regions in search of major structural features such as walls or floors, or one may be interested in searching for smaller objects like books on tables which would typically correspond to smaller segments.

Figure 1A:
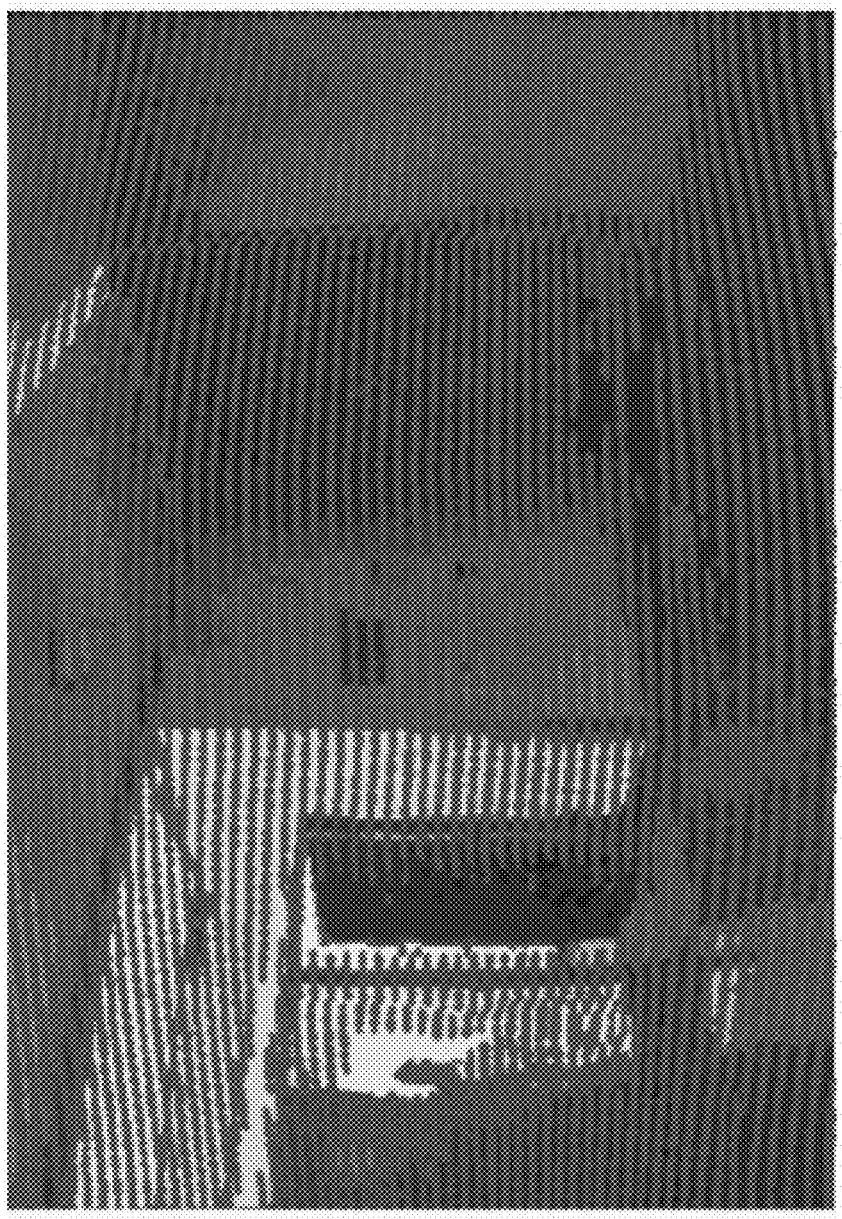
FIG. 1A is a photographic overlay of an image and the corresponding range data, showing a sample input image after color based segmentation with the 3D points projected into the frame.
Figure 1B:
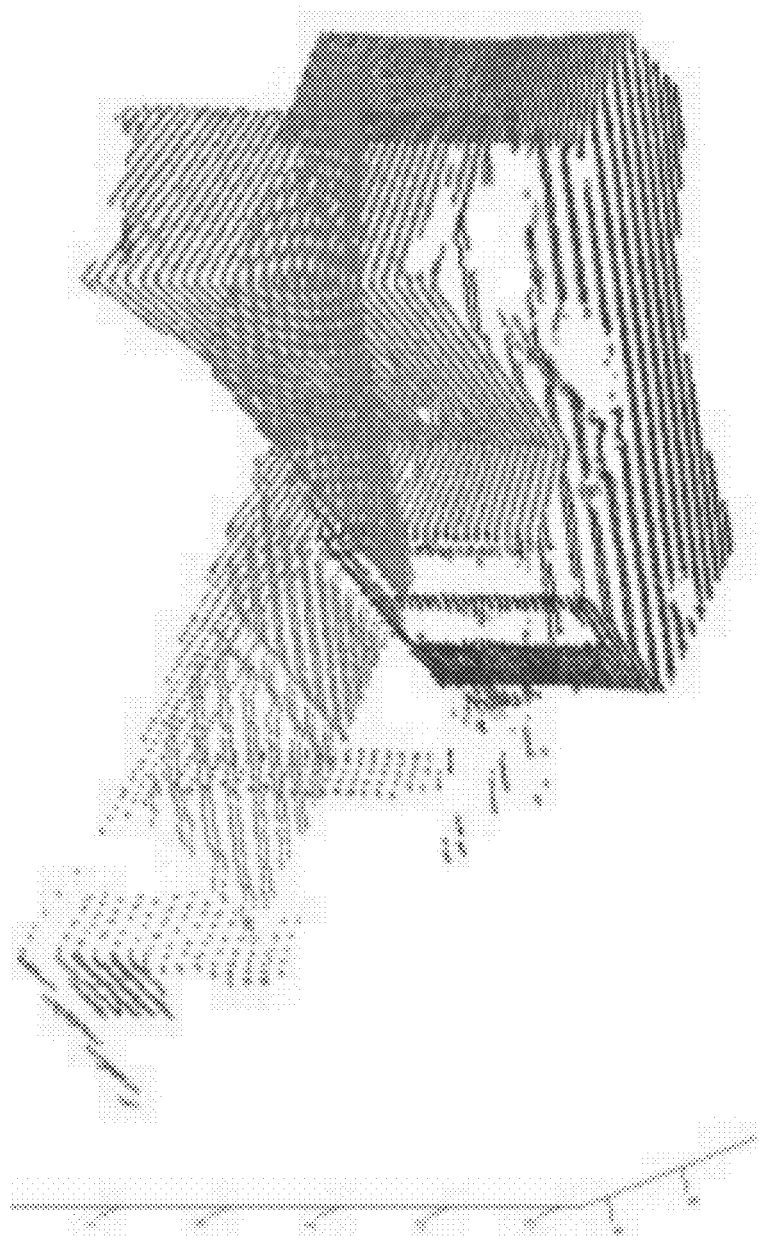
FIG. 1B shows the 3D planes recovered by embodiments of the present invention.

As a step towards the goal of detecting relevant objects such as walls, doors, windows, tables and chairs, the present application proposes a scheme which can be used to rapidly parse a scene into a collection of planar surfaces as illustrated in FIGS. 1A and 1B. The algorithm takes as input a 3D point cloud and an associated color image. The system then makes use of a recently developed real time segmentation scheme to divide the color image into coherent regions. These regions can then be used to suggest groupings of the 3D points to a RANSAC based interpretation process which extracts the relevant planar surfaces. FIG. 1B shows an example of an input image that has been passed through the segmentation process. The associated point cloud has been projected into the frame and overlaid on the image. FIG. 1A shows the planar surfaces that have been extracted by the procedure, each of the recovered planes is assigned a unique color.

Figure 2:
FIG. 2 is a photograph of the PR2 humanoid robot was used in some embodiments to capture the input imagery and range scans. This platform can be equipped with an array of cameras and a Hokuyou range scanner mounted on a tilting platform.

In experiments, range and image data were acquired using the PR2 humanoid robot 10 from Willow Garage shown in FIG. 2. This platform can be equipped with a Hokuyo range finder 14, which includes a 3D planar laser scanner mounted on a tilting platform, and an array of cameras 12 mounted on a pan-tilt head. A calibration procedure can be performed to recover the intrinsic parameters of the cameras and the geometric relationship between the camera platform and the range finder. This allows one to project the 3D points acquired with the range scanner 14 onto the image as shown in FIG. 1. This projection procedure takes into account the radial and tangential distortion in the camera projection model and the displacement between the range scanner and the camera.

While the PR2 platform 10 is one choice for development and debugging, the algorithms that have been developed do not rely on any special capabilities of this robot. The 3D point cloud can be accurately registered to the associated color imagery. As such, the scheme could equally be applied to the data produced with a Swiss Ranger and a color camera or to the imagery gathered with a Primesense 'Kinect' sensor, which includes an imaging camera, an IR illumination source and an IR camera near the imaging camera to add IR range finding capability.

The parsing procedure can makes use of a segmentation scheme based on randomized hashing, such as the segmentation scheme described in more detail in concurrently filed application, titled "Image Segmentation for Distributed Target Tracking and Scene Analysis," patent application Ser. No. 61/418,789, which has common inventorship and is incorporated herein by reference. Other segmentation schemes, such as those described in the prior art may also be suitable for the application. In some embodiments, the segmentation scheme employs a feature based approach. Each pixel in the image can be represented by a feature vector which encodes a set of properties used to describe that pixel. Some embodiments can employ a simple HSV color descriptor vector, while others can use more sophisticated feature vectors such as a histogram of color values or a vector of texture coefficients.

Given a set of feature vectors, the goal of the segmentation procedure is to divide them into a set of clusters which capture the most salient groupings in the distribution. To do this, one scheme employs a randomized hashing procedure where the feature vectors are hashed onto binary codes using a series of randomly chosen splitting planes.

For each of the hash codes the clustering procedure records how many feature vectors are mapped to that code. One can expect that clusters in feature space will induce population maxima in the code space. That is, if we consider the set of hash codes as a graph we would expect to observe that some of the hash codes have a greater population than their neighbors. This can reduce the original problem of clustering vectors in the feature space to the simpler problem of looking for population maxima in the code space graph.

The scheme is similar in spirit to the Mean Shift segmentation algorithm which also seeks to identify modes in the distribution of feature vectors. Where the mean shift scheme uses a Parzen Window based scheme to estimate density in feature space, this scheme uses randomized hashing to identify relevant groupings of feature vectors.

An advantage of the proposed segmentation scheme is that the computational effort required scales linearly in the number of pixels and the operations required are simple and regular. In order to demonstrate this fact, a real time version of the scheme was implemented on a Macbook Pro laptop computer. This implementation was used to segment 640 by 480 video frames at a rate of 10 frames per second using a single core of an Intel Core 2 Duo processor running at 2.33 GHz. This rate includes the time taken for all phases of the algorithm, image acquisition, randomized hashing, local maxima detection and connected components processing. Since almost all of the steps in the procedure are embarrassingly parallel, the algorithm is a well suited to implementation on modern multi-core processors and GPUs and should be amenable to further acceleration.

Once the color image has been segmented, the 3D points that have been projected into the frame can be tagged with the label of the image segment that they project to. This provides a useful partitioning of the 3D point data sets into subsets that are quite often semantically meaningful.

This partitioning allows groupings to a RANSAC based interpretation process. More specifically, the scheme can consider each of the image regions in turn and pulls out the 3D points that project to that image segment. Using this subset, the system can runs a RANSAC loop wherein it randomly selects groups of 3 points and constructs the plane passing through those selections. Each candidate plane is scored based on the number of inliers it attracts in the point cloud and the best candidate is retained. An iteratively re-weighted least squares procedure can then be invoked to refine the parameters of the plane. Finally all of the inliers of the resulting refined plane in the point data set can be removed from further consideration and the next image segment is considered.

In some embodiments, At the beginning of the interpretation process the image segments can sorted by population so that the larger regions are considered first. This heuristic tends to speed up the interpretation process since, in indoor environments, large coherent regions in the image often correspond to planar regions. Detecting these regions early in the interpretation process removes those points from further consideration and, thus, speeds the overall interpretation procedure.

The number of RANSAC iterations required to find an inlier set is typically quite low since 3D points that project to the same image segment are very often on the same surface. This means that the chances of picking an acceptable set of inliers from each group is relatively high and the computational effort required to find such a grouping is concomitantly low.

Since the procedure can consider every image segment, it can be effective at finding relatively small planar regions that may represent a small fraction of the overall data set but that are grouped together by the image segmentation procedure. Such groupings might be particularly difficult to find if we were to search for them by picking triples of points from the data set at random.

Algorithm 1 Fast Scene Interpretation

```
1:  Segment the color image using randomized hashing
2:  Project the 3D points onto the image
3:  Sort the image segments by population
4:  for i = 0 to npasses do
5:      for all image segments do
6:          Find all of the 3D points that project to this segment
7:          for j = 0 to ransac-its do
8:              Select 3 points from the subset
9:              Construct the plane through those points
10:             Score the plane by counting inliers in the point cloud
11:             Retain the best plane
12:         end for
13:         Refine the best plane using iteratively reweighted least
                squares fitting
14:         Find all of the inliers to this plane in the point cloud and
                remove them from further consideration
15:     end for
16: end for
```

Figure 3:
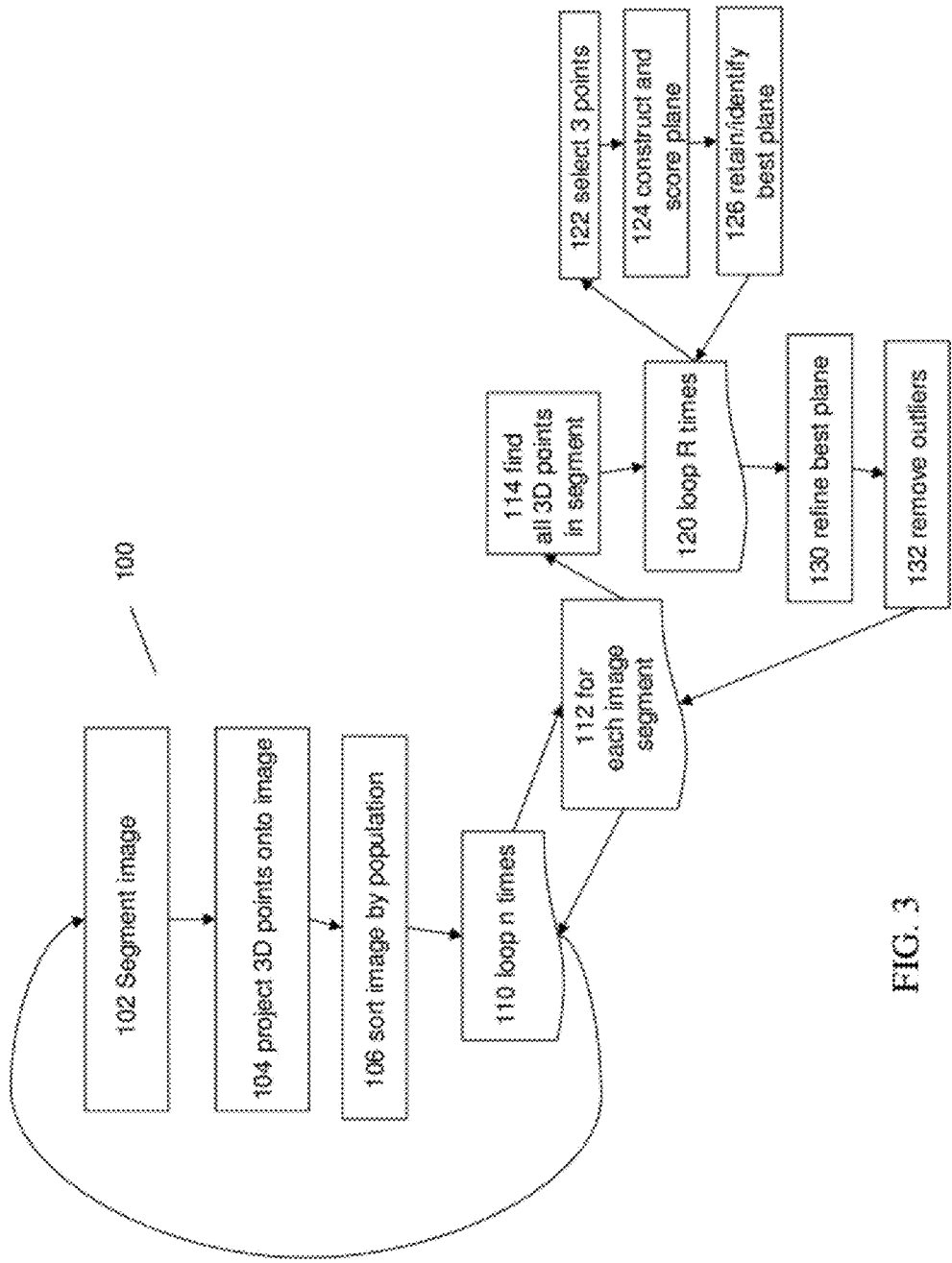
FIG. 3 is a flow chart depicted an exemplary embodiment of scene interpretation for use with embodiments of the invention.
Figure 4A:
FIGS. 4a-9c show sample photographic input and output to the scene interpretation process for a variety of different real-world scenarios as analyzed by certain embodiments.
Figure 4B:
Figure 4C:
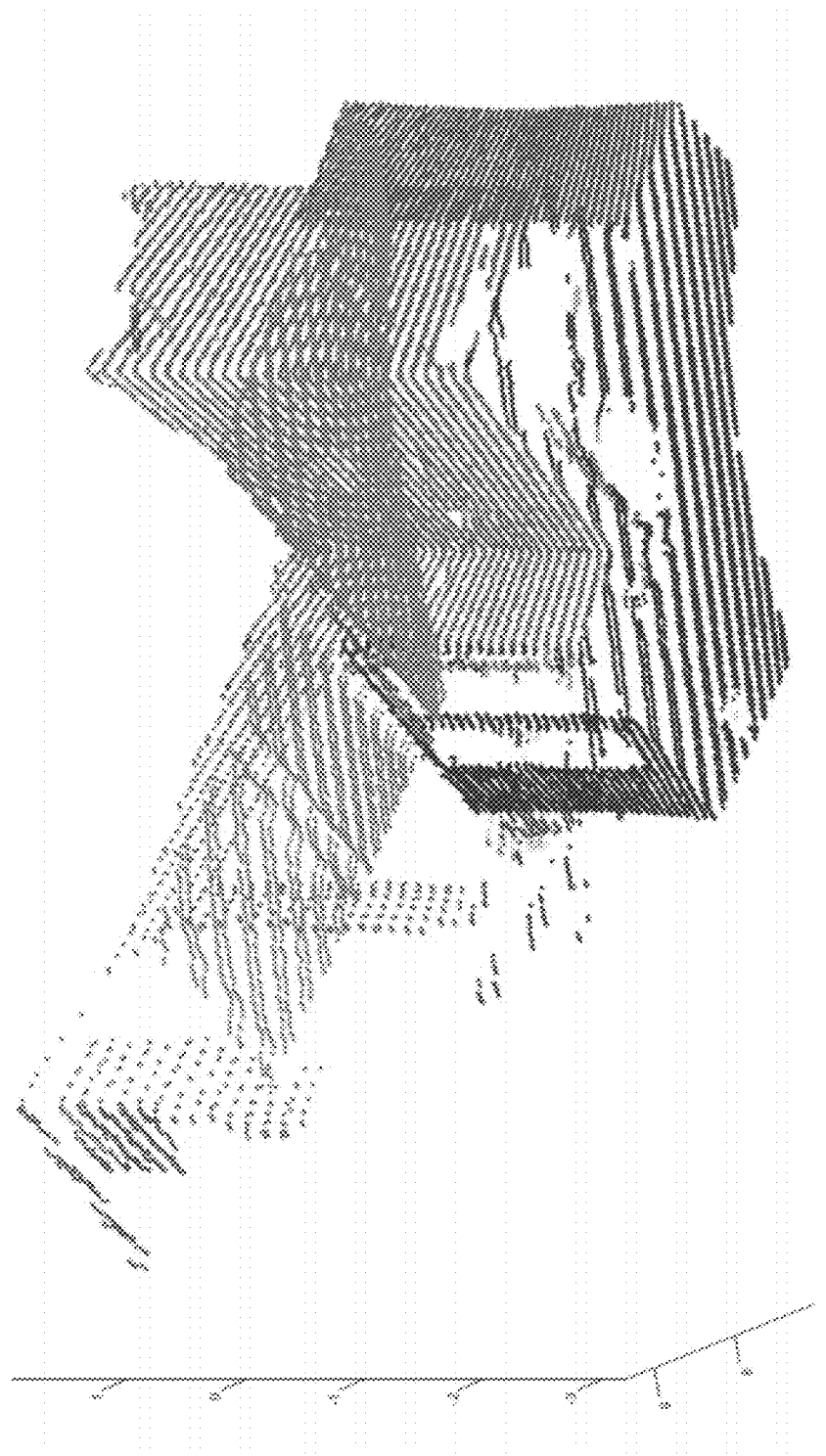
Figure 5A:
Figure 5B:
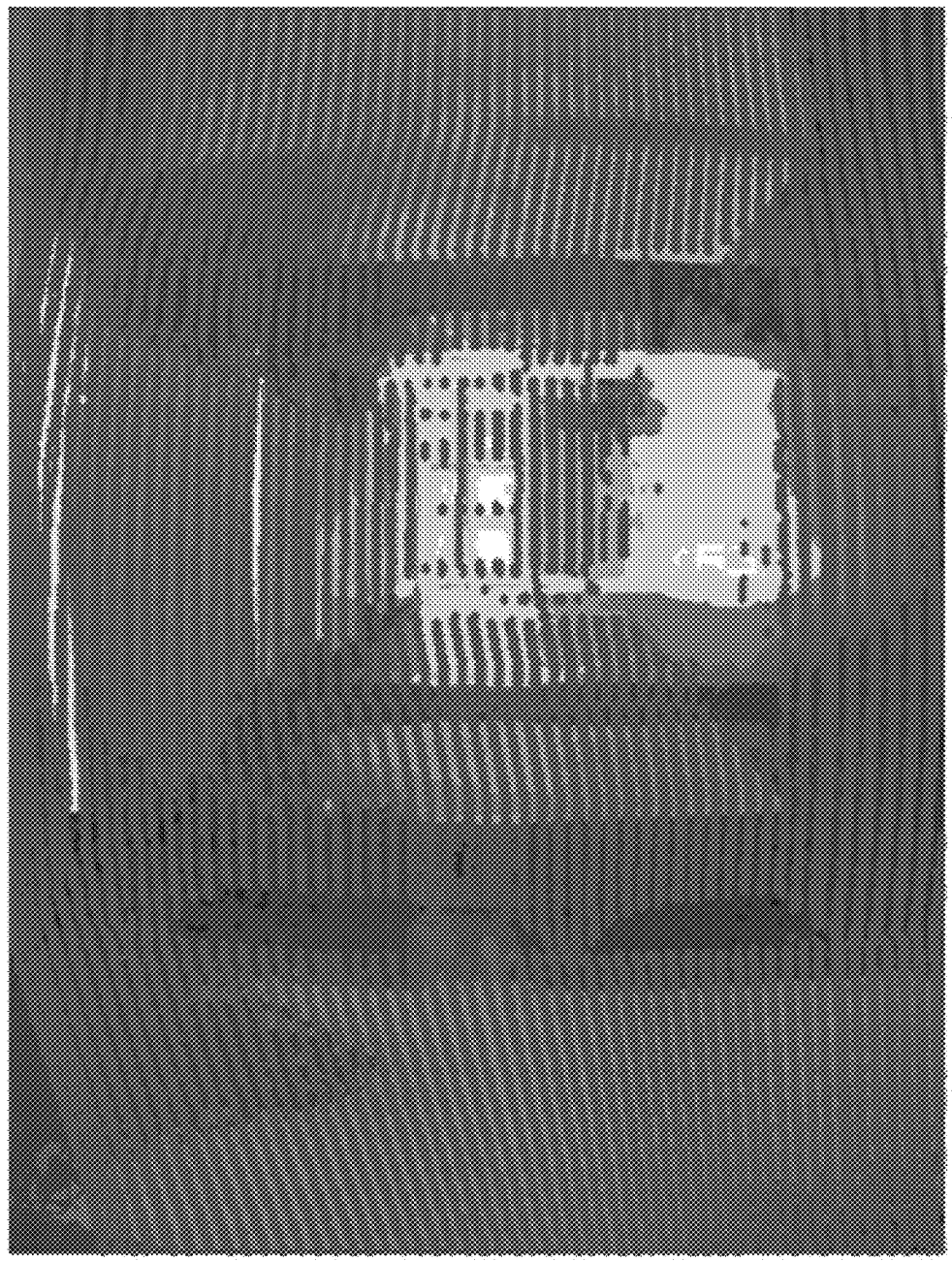
Figure 5C:
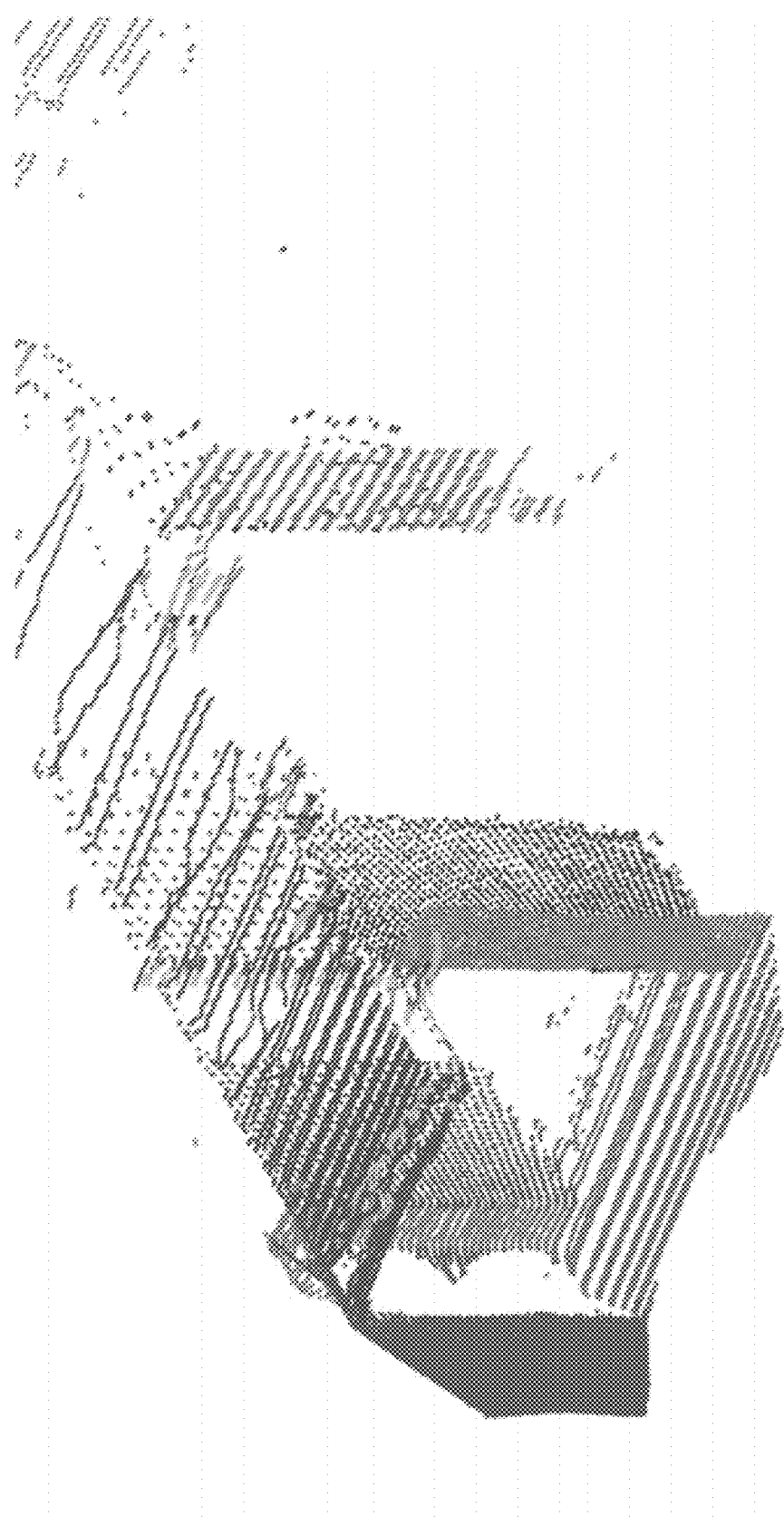
Figure 6A:
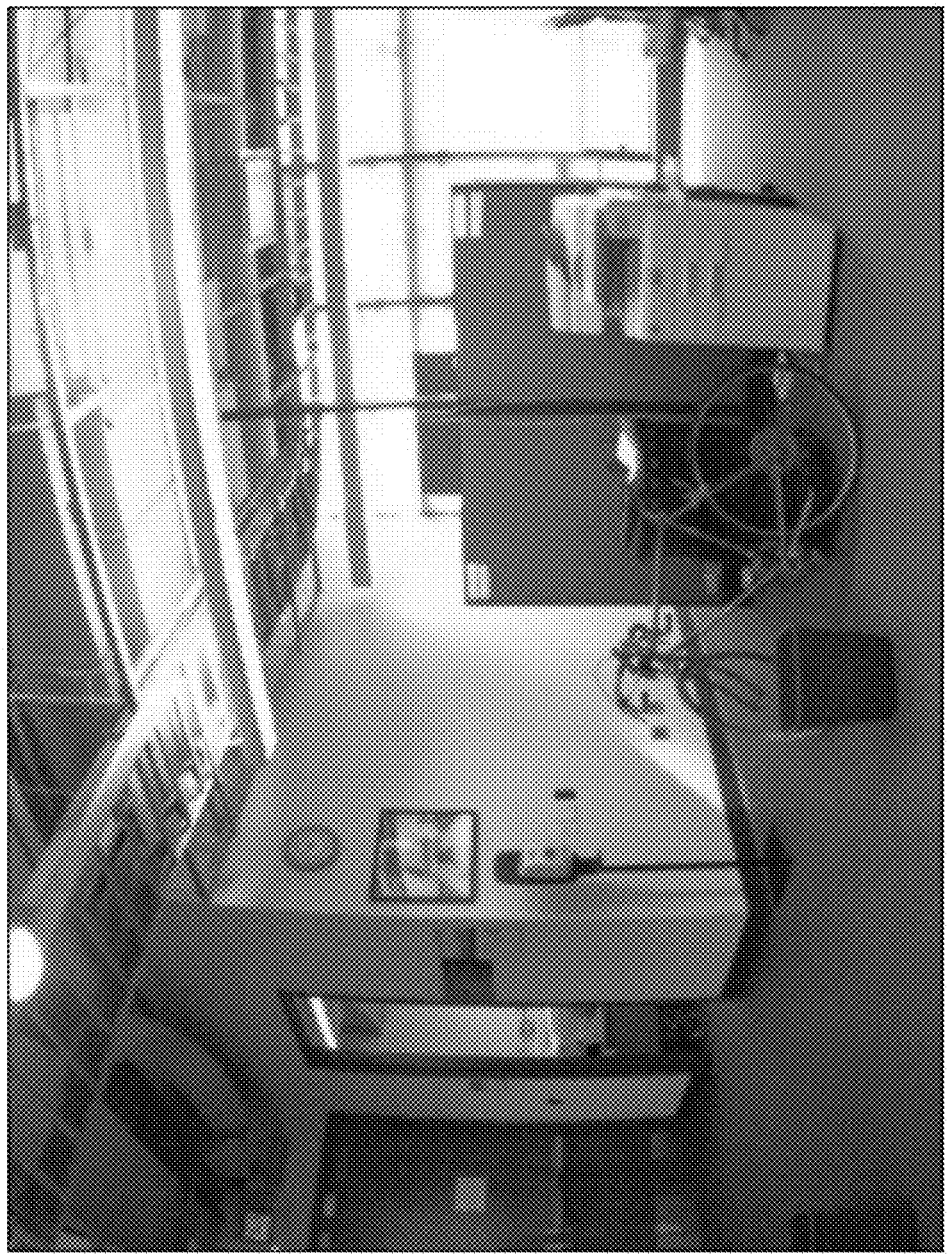
Figure 6B:
Figure 6C:
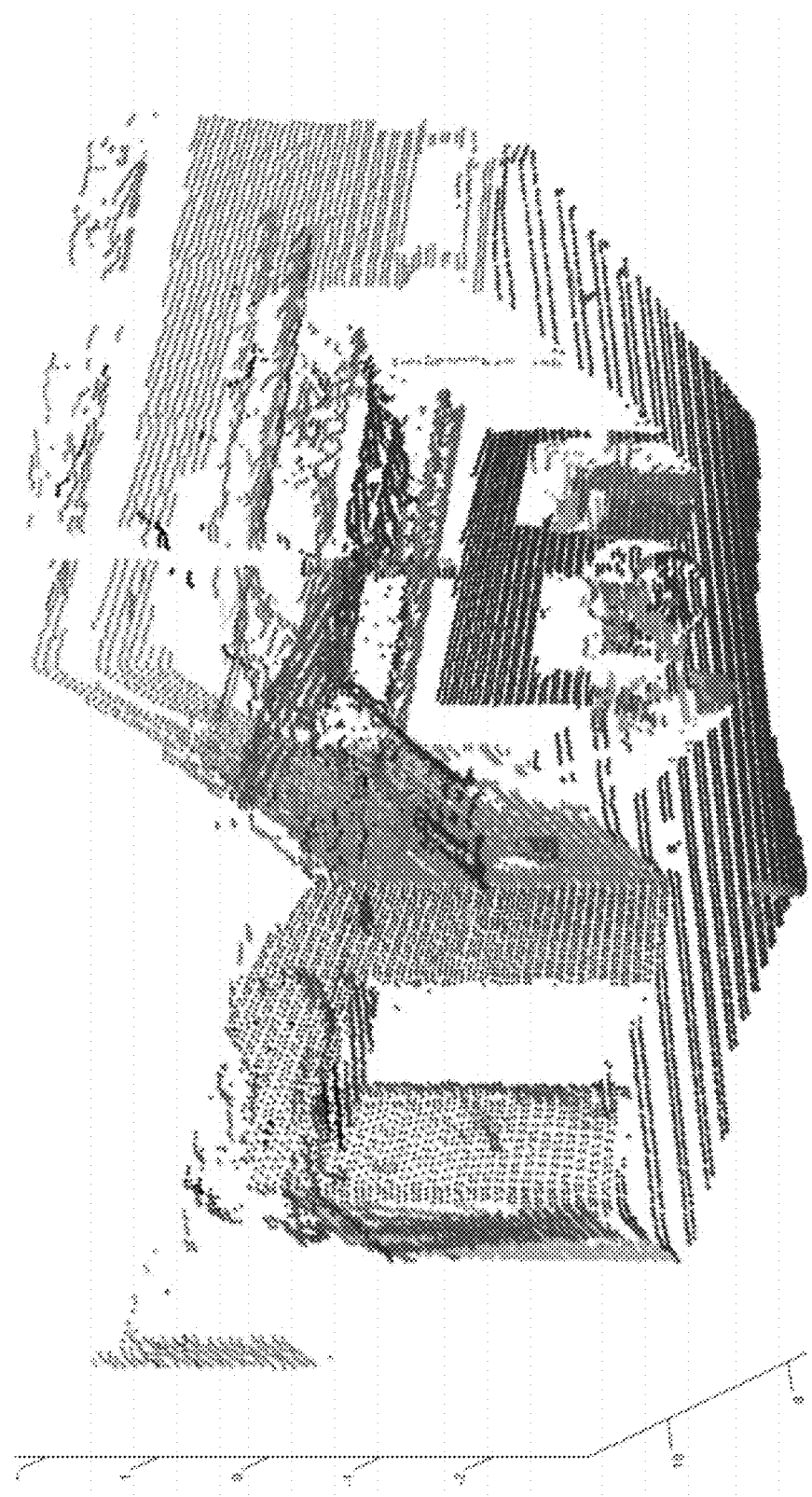
Figure 7A:
Figure 7B:
Figure 7C:
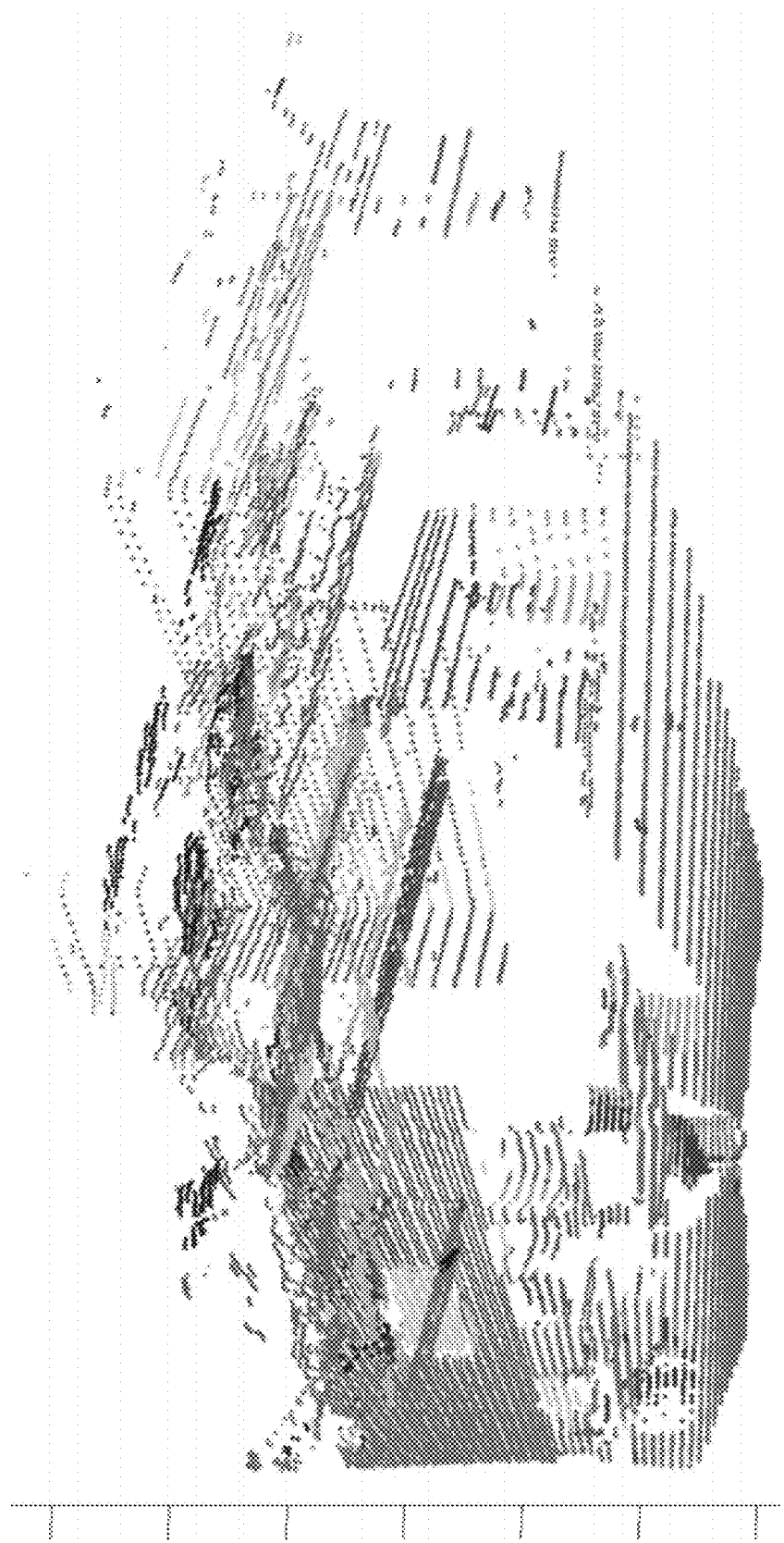
Figure 8A:
Figure 8B:
Figure 8C:
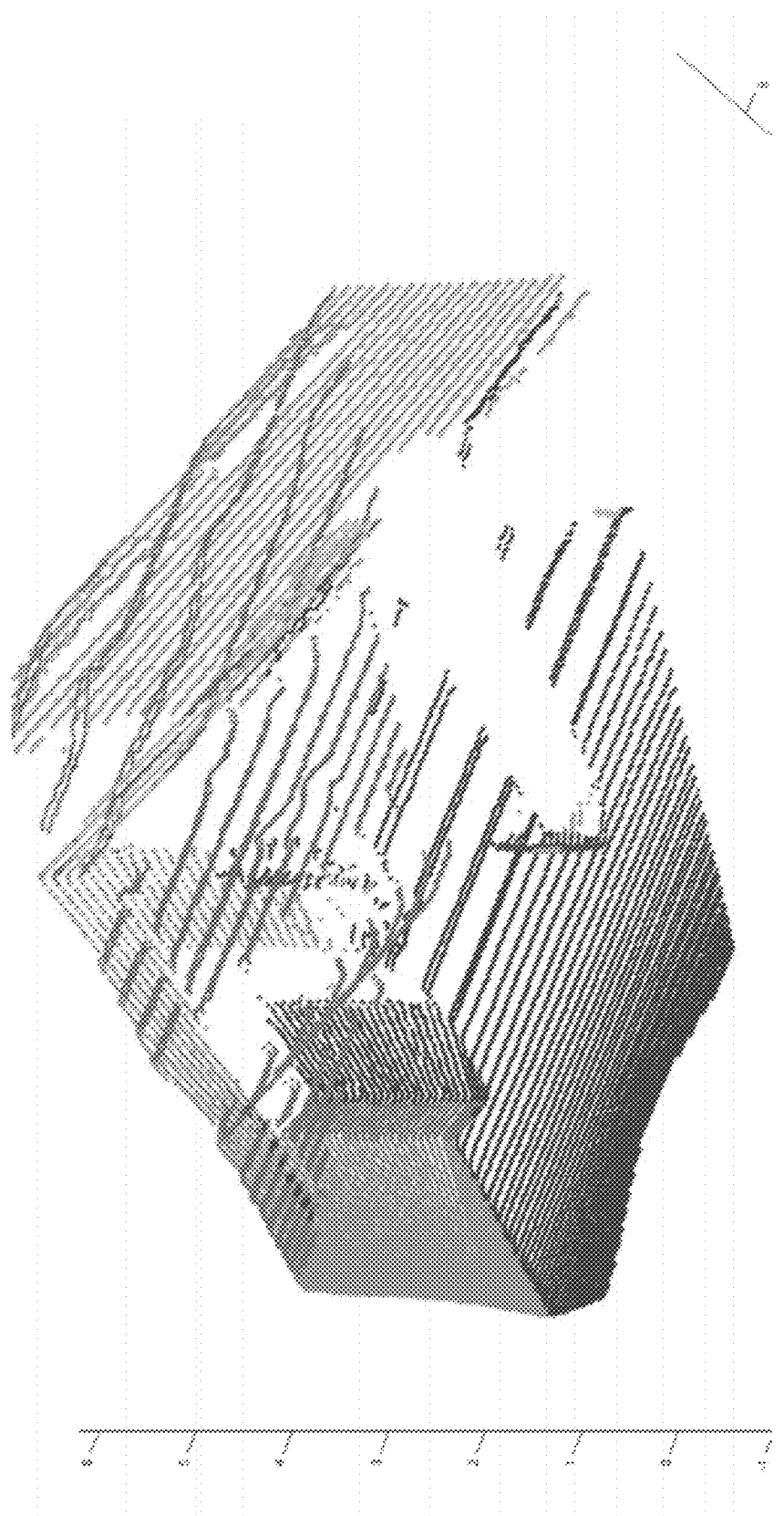
Figure 9A:
Figure 9B:
Figure 9C:

Algorithm 100 is shown in FIG. 3. This algorithm can be used to analyze each image in a video stream to provide real-time surface analysis of 3-D environment or maybe used on single frame images to provide a one-time model. At step 102, the image (e.g. a color image) is segmented using a segmentation technique. For example, the image may be segmented via mean shift segmentation or randomized hashing. As explained herein.

At step 104 range data is combined with the image data. For example, in an imaging device includes an image sensor and a range sensor, such as shown in FIG. 2, the range data can be easily overlaid in the image plane to associate each image pixel with its 3-D range location.

At step 106, the segmentation of the image is used just to sort the image by population. For example, the analysis of environment can be expedited by limiting range analysis to only larger segments in the image. For example, this can be used to easily identify walls while ignoring smaller objects that are less germane to the environment. This can allow the planar approach quickly identify the salient features that are planes, while other algorithms can be used to analyze smaller details, if desired.

At step 110 a main loop begins to associate planes with the image. In some embodiments, the loop at 110 can be iterated multiple times, n, for the same image to create a more refined analysis, in some embodiments of the algorithm. In some embodiments, n=1. In embodiments where n>1, the algorithm can be used to identify multiple planes within a selected image segment.

At step 112 each image segment chosen at step 106 is selected from the image for analysis. The image segments can be any desired subset of the image segments in the image, such as the largest segments available. For each of these selected image segments a RANSAC algorithm will be applied to fit planes to the image segment. The result of this RANSAC algorithm will be a best fit single 3D plane for the at least a portion of the segment (as explained below).

At step 114 a processor operating algorithm will locate all three points in the segment. This limits the cover additional problem of fitting a plane to the range information. At step 114 image data can be ignored. And only a subset of range pixels will be used. That is only the pixels in the range image associated with the segment selected are used. This gives a priori knowledge to the RANSAC algorithm of the candidate area for a plane that is most likely an area suitable for fitting a plane. In this manner, the computational overhead can be reduced by limiting the algorithm to those groups of range pixels that will likely yield a useful result.

At step 120, a RANSAC algorithm is used to iteratively find the best random plane that fits the 3D points. It also identifies the inlier points in the group of range pixels that support this plane. This is an estimate of the best fitting plane for the segment. The algorithm repeats a predetermined number of times, R. At step 122, a random three points/range pixels from the 3-D points at step 114 are selected. At step 124, these three points are used to define and construct a plane. This plane can then be scored by observing the 3-D points in the point cloud associated with the segment and comparing their locations to the plane constructed at step 124. This can determine the number of outliers and inliers based on threshold criteria. In some embodiments, this score is essentially a vote by each point in the subset of the point cloud identified at step 114, with each point voting for or against the random plane as a suitable fit. In some embodiments, points that do not meet threshold criteria for inliers or outliers do not affect the score.

At step 126, the plane constructed at step 124 is compared to a previously found best fit plane on a prior iteration of the loop 120. This allows the best scoring plane to be returned at the conclusion of loop 120.

At step 130 processor operating algorithm attempts to refine the best plane returned by loop 120. This refinement can be accomplished by iteratively re-weighting a least squares fitting. That is, the best fit plane returned by loop 120 is typically based on only three 3D points. Meanwhile, several points with the segment may have been inliers. At step 130, the inliers to the selected plane can be used to improve the plane. In some embodiments, the plane returned by step 120 is improve by performing a least squares fit of the plane to the inlier 3D points. It should be appreciated that one of many other best fit techniques may be suitable to further refine the plane.

At step 132, the refined plane from step 130 is compared to the available 3-D points the inliers can be deleted. The reason some embodiments delete these inliers is that the points have been matched to a salient plane, already. In effect, the algorithm has explained these points. The outliers can then be analyzed separately, as these may be objects on a wall, or any number of non-planer objects. It should be understood that the removal of inliers benefits future iterations of loop 110, for embodiments where n>1. These subsequent iterations can be used to determine other planer surfaces within the image segment.

Upon the completion of step 132, loop 112 completes and loop 110 may be repeated until it has repeated n times. After the completion of loop 110, if additional image data is available, such as in a video stream, algorithm 100 can repeat. For indoor scenes at least, the scheme can be viewed as a black box which reduces the reams of point data to a smaller set of planar primitives that can be matched between frames as the robot moves through the scene. These correspondences could be used to gauge the trajectory of the robot and to fuse 3D information gathered from a range of vantage points. Using the output of this interpretation system as the input to a higher level interpretation process, a system can explain the observed surfaces in terms of doors, floors, walls, tables, etc. Here again the ability to rapidly reduce tens of thousands of range points to tens of plane candidates simplifies the higher level parsing process and makes it much more tractable.

Furthermore, one could use the image segmentation information to delineate the extents of surfaces in the scene. Typically the range images that we can obtain are at a significantly lower resolution than the associated imagery. The boundaries of the regions in the image could be used to interpolate and extrapolate the surfaces in order to provide a clearer picture of the layout of the scene.

A system can further leverage the image data in distinguishing between salient surface regions that may be geometrically coplanar. For instance in a hallway closed doorways may lie flush with the walls but in the image they differ in appearance. By leveraging the image segmentation data one may be able to discriminate between surfaces or regions in the scene based on geometry and appearance. While planar surfaces are prevalent in indoor environments they are not the only structures that we are interested in extracting. A system could use the grouping information provided by the image to extract other relevant structures or more general shape models.

In some embodiments, the system and methods described herein could be used on cameras within a distributed tracking network. Rather than placing the ranging devices on movable objects, such as a robot, the ranging device and the methods and systems described herein could be integrated into a smart camera or cameras that participate in a network. These cameras could then use image sementation and range information to identify environmental features, such as walls, as well as objects (including the orientation of object) to be tracked, such as tracking people in an airport. A suitable system of cameras a tracking systems that could be used with the present application is disclosed in concurrently filed application, titled "Distributed Target Tracking Using Self Localizing Smart Camera Networks," which has common inventorship and is incorporated herein by reference.

Experimental Results

The proposed scene interpretation procedure was applied to data sets that were collected in and around an office complex. Like most indoor scenes these examples contained a number of planar surfaces along with a number of distracting point measurements caused by clutter and spurious range readings. The results obtained on a few of these scenes are shown in FIGS. 4a-9a. FIGS. 4a, 5a, 6a, 7a, 8a, and 9a shows the color image of the scene; FIGS. 4b, 5b, 6b, 7b, 8b, and 9b the segmented image along with the projection of the point cloud onto that frame. FIGS. 4c, 5c, 6c, 7c, 8c, and 9c show various views of the processed 3D point cloud where each of the extracted planes is given a unique color.

Table I summarizes some of the relevant numbers associated with each of the scan data sets shown in FIG. 3. These results show that the total number of candidate triples considered by the interpretation procedure is fairly low in comparison to the total number of 3D points in each of the data sets. This indicates that the segmentation procedure is doing a good job of focusing the efforts of the interpretation procedure since even with this small number of candidates the procedure does a creditable job of parsing the scene into a relatively small number of salient planar surfaces. The total number of RANSAC iterations is even less than the number of extracted segments since earlier stages of interpretation typically absorb the points associated with several image regions as inliers so those segments are not considered in subsequent stages.

TABLE I

| PROCESS MEASUREMENTS | | | | | | |
|---|---|---|---|---|---|---|
| Data Set no. | 1 | 2 | 3 | 4 | 5 | 6 |
| Number of 3D points | 59137 | 57368 | 60432 | 60107 | 60458 | 58324 |
| Number of Image Segments | 2534 | 2859 | 3854 | 4271 | 2847 | 2781 |
| Number of Recovered planes | 14 | 15 | 33 | 40 | 11 | 20 |
| Total number of RANSAC its | 560 | 720 | 1320 | 1600 | 440 | 800 |
| Estimated RANSAC its without segmentation | 2391 | 300859 | 97499 | 268110 | 476 | 6614 |
| Running time of interpretation procedure in seconds | 0.301 | 0.335 | 0.676 | 0.813 | 0.252 | 0.433 |

For comparison, one can estimate for the number of RANSAC iterations that would have been required to find the same set of planes without the benefit of image segmentation information. Here the number of iterations required to find a set of 3 inliers on a plane containing k points in a point cloud of N points is approximated as $(N/k)^3$. The estimate for the number of RANSAC iterations required is the sum of the iterations to required to recover each of the extracted planes starting from the most populous and proceeding to the smallest removing the detected inliers at each stage. This estimate may be typically several times higher than the number of RANSAC iterations carried out by the proposed procedure.

Table I also records the total time required to perform the scene interpretation procedure which was implemented in MATLAB without any significant optimization and run on a MacBook Pro laptop. The average running time across all six trials was 0.47 seconds. This suggests that the entire interpretation procedure, including the image segmentation step, could be performed several times a second on a laptop class machine.

The scheme can pull out small surfaces with relatively few inliers. This illustrated in FIG. 10, which shows a closeup view of the interpretation produced for the first data set in FIG. 4a. This closeup highlights the fact that the EXIT sign on the ceiling and the card reader on the wall are both pulled out as distinct surfaces even though they constitute a relatively small proportion of the point cloud. Similarly in the fourth data set the box on the table is successfully distinguished from the surface of the table and the background. Most of the apparent clutter in this particular data set is the result of the interpretation procedure detecting and delineating small surfaces on the structures in the ceiling. In the sixth scan data set, the table in the foreground is distinguished from the books lying on that surface, the chair backs are also recovered as separate regions. This is due to the fact that these subsets are identified as coherent groups in the segmented image and as such are eventually discovered and reported.

It should be readily apparent that the image processing techniques taught herein are suitable for execution in a computing environment that includes at least one processor. Suitable processing environments can include Intel, PowerPC, ARM, or other CPU-based systems having memory and a processor, but can also include any suitable embedded systems, DSP, GPU, APU, or other multi-core processing environment including related hardware and memory. Similarly, the algorithms taught herein can be implemented by dedicated logic. Similarly, execution of these algorithm and techniques is not limited to a single processor environment, and can, in some contemplated embodiments, be performed in a client server environment, a cloud computing environment, multicore environment, multithreaded environment, mobile device or devices, etc.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A method comprising:
   determining, respectively, a feature vector for each pixel of a plurality of pixels of a color image;
   determining a feature space comprising the plurality of feature vectors;
   randomly determining a plurality of first planes;
   randomly dividing the feature space with the plurality of first planes to form a plurality of regions of the feature space;
   determining a respective hash code for each region of the plurality of regions, wherein a hash code is indicative of a location of an associated region with respect to each first plane of the plurality of first planes;
   determining a number of feature vectors that map to each hash code;
   selecting a region of the plurality of regions based on a number of feature vectors that map to each hash code;
   associating each feature vector of the selected region with a respective three dimensional location to generate a plurality of three dimensional locations;
   partitioning the plurality of three dimensional locations into a plurality of partitions;
   selecting a partition of the plurality of partitions;
   identifying a first set of three dimensional locations associated with the selected partition; and
   estimating a second plane that describes the three dimensional locations associated with the selected partition.

2. The method of claim 1, wherein the estimating comprises a RANdom SAmple Consensus to estimate a best fitting plane.

3. The method of claim 1, further comprising iteratively estimating the second plane.

4. The method of claim 1, wherein the partition is selected based on a size of a segment associated with a partition.

5. The method of claim 1, wherein the partition is selected based on a salient feature of the color image.

6. An apparatus comprising:
   a processor; and
   memory coupled to the processor, the memory comprising executable instructions that when executed by the processor cause the processor to effectuate operations comprising:
   determining, respectively, a feature vector for each pixel of a plurality of pixels of a color image;
   determining a feature space comprising the plurality of feature vectors;
   randomly determining a plurality of first planes;
   randomly dividing the feature space with the plurality of first planes to form a plurality of regions of the feature space;
   determining a respective hash code for each region of the plurality of regions, wherein a hash code is indicative of a location of an associated region with respect to each first plane of the plurality of first planes;
   determining a number of feature vectors that map to each hash code;
   selecting a region of the plurality of regions based on a number of feature vectors that map to each hash code;
   associating each feature vector of the selected region with a respective three dimensional location to generate a plurality of three dimensional locations;
   partitioning the plurality of three dimensional locations into a plurality of partitions;
   selecting a partition of the plurality of partitions;
   identifying a first set of three dimensional locations associated with the selected partition; and
   estimating a second plane that describes the three dimensional locations associated with the selected partition.

7. The apparatus of claim 6, wherein the estimating comprises a RANdom SAmple Consensus to estimate a best fitting plane.

8. The apparatus of claim 6, the operations further comprising iteratively estimating the second plane.

9. The apparatus of claim 6, wherein the partition is selected based on a size of a segment associated with a partition.

10. The apparatus of claim 6, wherein the partition is selected based on a salient feature of the color image.

11. Memory comprising executable instructions that when executed by a processor cause the processor to effectuate operations comprising:
- determining, respectively, a feature vector for each pixel of a plurality of pixels of a color image;
- determining a feature space comprising the plurality of feature vectors;
- randomly determining a plurality of first planes;
- randomly dividing the feature space with the plurality of first planes to form a plurality of regions of the feature space;
- determining a respective hash code for each region of the plurality of regions, wherein a hash code is indicative of a location of an associated region with respect to each first plane of the plurality of first planes;
- determining a number of feature vectors that map to each hash code;
- selecting a region of the plurality of regions based on a number of feature vectors that map to each hash code;
- associating each feature vector of the selected region with a respective three dimensional location to generate a plurality of three dimensional locations;
- partitioning the plurality of three dimensional locations into a plurality of partitions;
- selecting a partition of the plurality of partitions;
- identifying a first set of three dimensional locations associated with the selected partition; and
- estimating a second plane that describes the three dimensional locations associated with the selected partition.

12. The memory of claim 11, wherein the-estimating comprises a RANdom SAmple Consensus to estimate a best fitting plane.

13. The memory of claim 11, the operations further comprising iteratively estimating the second plane.

14. The memory of claim 11, wherein the partition is selected based on a size of a segment associated with a partition.

15. The memory of claim 11, wherein the partition is selected based on a salient feature of the color image.

* * * * *